United States Patent [19]
Humphrey

[11] 3,915,550
[45] Oct. 28, 1975

[54] STABILIZED BINOCULAR
[75] Inventor: William E. Humphrey, Oakland, Calif.
[73] Assignee: Optical Research and Development Corporation, Berkeley, Calif.
[22] Filed: Oct. 2, 1974
[21] Appl. No.: 511,419

[52] U.S. Cl. .................................. 350/16; 356/148
[51] Int. Cl.$^2$......................................... G02B 23/00
[58] Field of Search ............... 350/16; 356/148, 248

[56] References Cited
UNITED STATES PATENTS
3,677,618   7/1972   Schwemin............................ 350/16

Primary Examiner—R. V. Rolinec
Assistant Examiner—Darwin R. Hostetter
Attorney, Agent, or Firm—Townsend and Townsend

[57] ABSTRACT

The optical stabilization of the paired ocular paths of a binocular against accidental angular motion is disclosed. Each ocular path of the disclosed binocular includes an objective, an eye piece, and a mirror array for relaying the optical path to the viewer. The mirror arrays for each ocular path are arranged to impinge on opposite sides of a movable and stabilizing back to back reflective element. The movable back to back reflective element is pivoted about at least one axis substantially normal to the viewing axis of the binocular. Movement of the back to back reflective element provides precisely equal stabilization of each of the light paths. A first mirror array is disclosed wherein a periscope for one light path and a corner cube for the opposite light path each impinge their light on opposite sides of a fluid cell mounted mirror. A second mirror array is disclosed wherein side-by-side mirror arrangements similar in effect to Porro prisms for each ocular path have corresponding stabilizer mirror pairs mounted for identical stabilizing movement.

13 Claims, 8 Drawing Figures

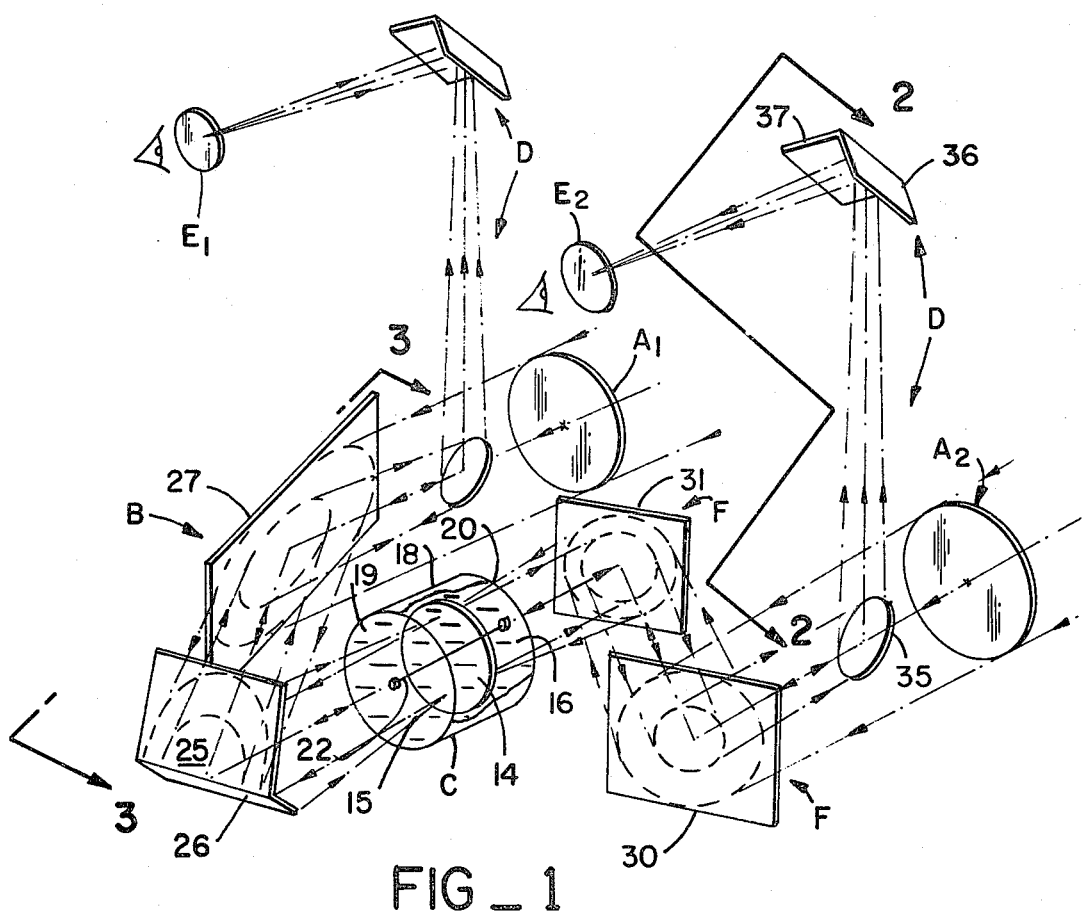
FIG_1
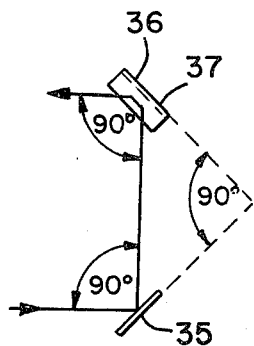
FIG_2
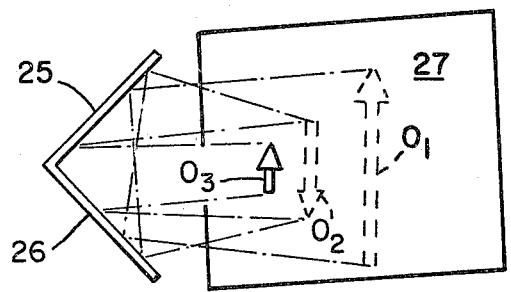
FIG_3

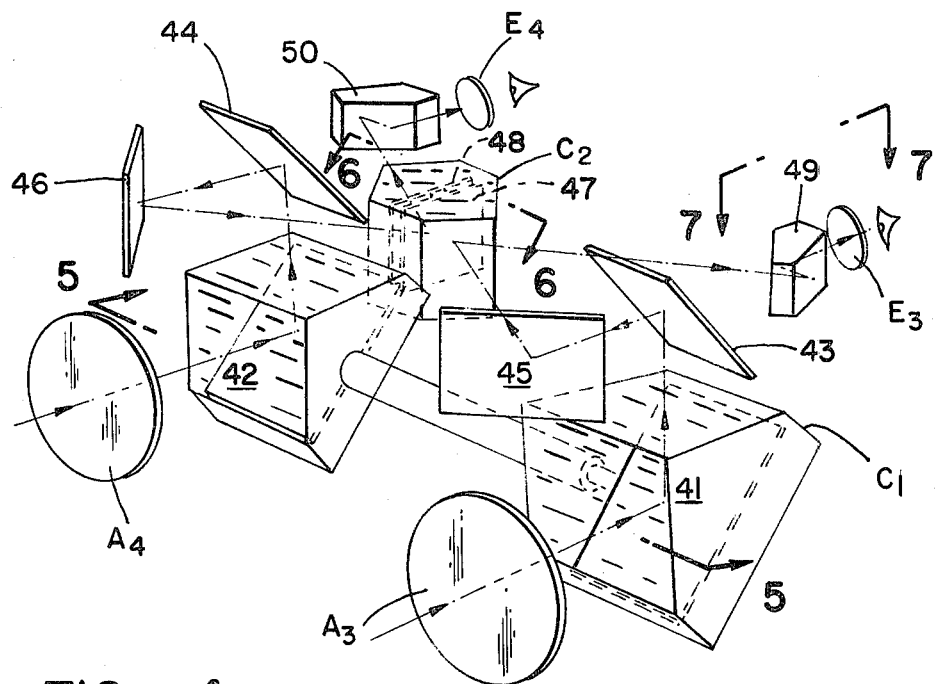
FIG_4
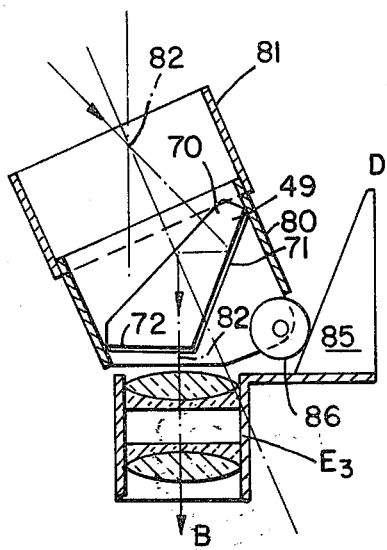
FIG_7
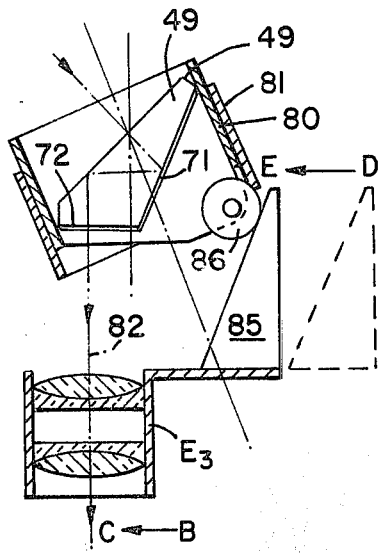
FIG_8

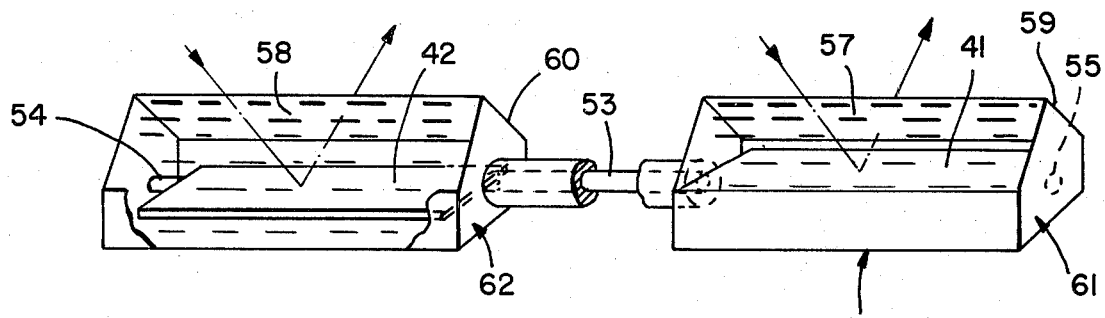
FIG_5
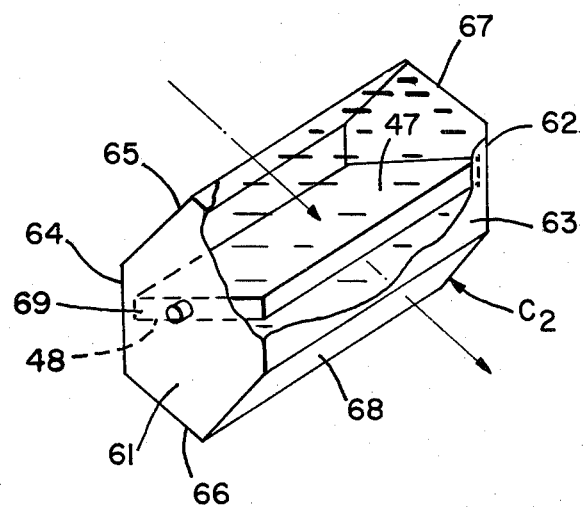
FIG_6

STABILIZED BINOCULAR

This invention relates to optical stabilizers for damping ambient accidental vibrational motion from optical instruments. More particularly, the present invention relates to a binocular having its paired light paths simultaneously stabilized to provide stabilized binocular vision in a binocular subjected to accidental angular motion.

SUMMARY OF THE PRIOR ART

Heretofore, the stabilization of binoculars to dampen out the vibration of accidental angular motion has divided itself into two separate groups.

In a first group of stabilizing devices, mechanical linkages extending between spaced apart optical elements in each of the two optic paths of a binocular have functioned to move corresponding elements corresponding amounts to produce stabilization. Such devices are extremely complex to build. Moreover, the mechanical linkages can produce difficulties in maintenance and operation. Such devices commonly stick and/or have limited ability to pan and follow rapidly moving objects because of their complex mechanical linkages.

Heretofore, I have suggested having paired ocular paths impinge at separate locations on the same mirror. See Humphrey U.S. Pat. No. 3,711,178, entitled "Mirror Stabilizer Having Space Referenced Motion", issued Jan. 16, 1973. This suggestion permits the stabilization about a first axis at right angles to the view path. However, for complete stabilization, an additional component of optical stabilization must be provided to stabilize light relative to an axis which is orthogonal to the first view path and to the first axis about which stabilization occurs. Stabilization in this second axis has heretofore proven impractical. Specifically, where light must impact the same reflective surface at two adjacent locations, the mirror increases in size. Moreover, the light impacts the mirror typically at locations away from the pivotal axis about which the mirror turns the stabilized light. This causes unequal angular shift of the resultant stabilized image and results in eye strain. Moreover, change in light path overall length can occur, which change either destroys focus, causes unequal image movement, or both.

Secondly, the mounting of an entire prism array for stabilized movement between an objective and eye piece has been considered. This pivotal movement of an entire prism array has thus far created angular shifts of unequal displacement for each of the respective eye paths. Additionally, angular movement of many prisms results in shifting of the image in the binocular assembly. As appreciable excursions of an image at a binocular eye piece are unacceptable, this approach to the problem has not been practical.

SUMMARY OF THE INVENTION

The optical stabilization of the paired ocular paths of a binocular against accidental angular motion is disclosed. Each ocular path of the disclosed binocular includes an objective, an eye piece, and a mirror array for relaying the optical path to the viewer. The mirror arrays for each ocular path are arranged to impinge on opposite sides of a movable and stabilizing back to back reflective element. The movable back to back reflective element is pivoted about at least one axis substantially normal to the viewing axis of the binocular. Movement of the back to back reflective element provides precisely equal stabilization of each of the light paths. A first mirror array is disclosed wherein a periscope for one light path and a corner cube for the opposite light path each impinge their light on opposite sides of a fluid cell mounted mirror. A second mirror array is disclosed wherein side-by-side Porro prisms like mirror arrays for each ocular path have corresponding stabilizer mirror pairs mounted for identical stabilizing movement.

OTHER OBJECTS AND ADVANTAGES OF THE INVENTION

An object of this invention is to disclose mirror arrays for each of the ocular paths of a binocular, each mirror array including in its reflective path a movable and stabilizing back to back mirror. The back to back mirror is positioned so that its motion causes stabilizing deviation of each ocular light path equal and opposite to the accidental angular deviation of the binocular.

An advantage of the mirror arrays of this invention together with the back to back mirror assembly is that the necessity of mechanical linkages for coupling corresponding elements in each of the binocular light paths is avoided. Construction of the stabilized binocular is simplified. Moreover, maintenance required for complex mechanical instruments is avoided.

Yet another advantage of this invention is that the mirror motion of the binocular stabilizer herein disclosed is particularly adapted to the mirror stabilizing cell disclosed in Humphrey U.S. Pat. No. 3,711,178, issued Jan. 16, 1973, entitled "Mirror Stabilizer Having Space Referenced Motion".

Yet another advantage of this invention is to disclose a relatively compact stabilized binocular of vastly reduced weight and bulk.

It is a further object of this invention to disclose two specific ocular paths for stabilizing binoculars.

A first such ocular path includes a mirror array for reflecting light to and receiving light from a stabilizer cell. According to this aspect of the invention, a single stabilized mirror is placed approximately midway between the objective and eye piece. The stabilizing mirror is reflective on opposite sides. Light from one objective is relayed to the mirror through a periscope assembly, and relayed from the mirror through the same periscope assembly to the eye piece. Similarly, light from the remaining objective is relayed to the mirror through a corner cube mirror configuration, and relayed from the mirror to the eye piece through the same corner cube mirror configuration.

An advantage of this mirror system is that the interocular separation can occur in two discrete places. First, the instrument can be made to rotate around and centrally to the stabilizer cell. Alternately, the instrument can be made to provide interocular separation to the eye piece by rotating around one or more of the ocular paths to either the objective or eye piece.

As an example of a second ocular path, paired optical paths are stabilized by mirror arrays in a Porro prism configuration. Each Porro prism array for each ocular includes two moving and stabilized mirrors. First pairs of mirrors (one mirror for each Porro prism mirror array) are coplanar and constructed so that their joint movement causes joint deviation and stabilization of the light in both binocular paths above one axis. A second stabilizing mirror in each path is constructed in back to back relation with the second stabilizing mirror in the remaining path. These two reflective surfaces, commonly on opposite sides of a flat plate, deviate light in each light path equally and oppositely to stabilize light about an axis orthogonal to the ocular axis of the instrument and the axis of the first mirrors.

An advantage of this latter Porro prism mirror array is that the retroreflection of light paths back onto themselves is not required. Blocking of a portion of the light paths does not occur.

Yet another advantage of this binocular is that the instrument constructed can be compact and easily placed in a binocular size casing.

Yet a further object of this invention is to disclose a simplified binocular stabilizer cell. The cell disclosed herein has reflective surfaces on opposite sides of a flat plate. The flat plate is immersed interiorly of the fluid cell having walls defining a fluid-tight volume. Each mirror is addressed to transparent portions of the cell walls. By the expedient of placing a transparent fluid interior of the cell, movement of the mirror responsive to accidental angular motion of the instrument and cell can occur to effect equal stabilization of the paired ocular paths of the binoculars.

An advantage of the cell herein disclosed is that one stabilizing cell can effectively stabilize two light paths simultaneously. Equal stabilization of the light paths is assured.

Other objects, features and advantages of this invention will become more apparent after referring to the following specification and attached drawings in which:

FIG. 1 is a perspective view of a binocular constructed in accordance with this invention in which the mirror array includes a periscope mirror array for one light path, a corner cube mirror array for the other light path, and a single stabilizer cell there between for stabilizing both ocular paths orthogonally to the light path of the instrument;

FIg. 2 is a section taken along lines 2—2 of FIG. 1 illustrating the ocular path adjacent one eye piece of the instrument;

FIG. 3 is a detail illustrating the function of a corner cube mirror in relaying an image to and from the stabilizer cell of this invention;

FIG. 4 is a perspective schematic view of the stabilizer of this invention illustrating a Porro prism mirror array for each ocular path, the Porro prism mirror array here including two movable stabilizing mirrors for each Porror prism array in each ocular path;

FIG. 5 is a detail of one stabilizer of FIG. 4 taken along lines 5—5;

FIG. 6 is a detail of the other stabilizer of FIG. 4 taken along lines 6—6; and, FIGS. 7 and 8 are illustrations of apparatus for creating the necessary interocular separation between paired optical paths of the binoculars herein disclosed.

Referring to FIG. 1, paired objectives A1 and A2 are illustrated receiving light from a distant object (not shown). Objective A1 passes converging light to a corner cube mirror assembly B and then to a stabilizer cell C. Light is retro-reflected from the stabilizer cell C through the corner cube mirror assembly B, and thence to a periscoping corner cube mirror assembly D. The periscoping corner cube mirror assembly D transmits light to eye piece E1.

Similarly, objective A2 passes light to stabilizer cell C through periscope mirror assembly F. Thereafter, light is retro-reflected from the stabilizer cell C to periscope mirror assembly F and then passed to eye piece E2 by a periscoping corner cube assembly D.

Objectives A1, A2 and eye pieces E1, E2 are configured in a typical telescopic array. Both objectives A1, A2 comprise positive lenses. Both eye pieces E1, E2 comprise positive lenses. It should be appreciated that both objectives and eye pieces can be altered to a variety of configurations; the only important aspect herein being that the image is erect as seen by the user.

The stabilizing cell here shown is of the type described in my U.S. Pat. No. 3,711,178, entitled "Mirror Stabilizer Having Space Referenced Motion", issued Jan. 16, 1973. This mirror stabilizer, however, differs in a crucial particular. Specifically, a flat plate 14 is placed interiorly of the cell. Plate 14 is reflective on both its sides 15, 16. Similarly, paired transparent walls 19, 20 provide for the transmission of light to and from the respective reflective surfaces 15, 16. Thus, stabilizing movement of plate 14 will cause equal and opposite reflective deflection of light in the light paths between objective A1 and eye piece E1, and equal and opposite reflective deflection of objective A2 and eye piece E2 of the binocular herein shown. It should be noted that it is this back to back mirror configuration of the reflective surfaces 15, 16 on plate 14 which is most important to this invention.

Regarding the importance of the back to back mirror configuration of the reflective surfaces 15, 16 on plate 14, at least two aspects can be discussed. First, as the mirror moves in stabilizing motion, it is preferred to have as little as possible a change in the overall length of the light path between each objective and each eye piece. Accordingly, if the mirror is to pivot, it is desirable to have the mirror pivot about a point centrally taken through the stabilizer cell C through plate 14.

Second, it will be immediately seen that no mechanical linkages or the like are required to interconnect the reflecting element for each light path. Rather, since both sides of plate 14 comprise the reflecting surfaces 15, 16, precisely equal and opposite reflective deflection of the light paths must occur with stabilizing movement of the plate 14.

Regarding the stabilizing movement of the plate 14, the plate is circular in shape. It is captured interiorly of a typically opaque cylindrical housing 18 having transparent end walls 19, 20. Typically, each end wall has mounted thereto a support for an elastic or tension thread 22.

Interiorly of the chamber 18 and the transparent end walls 19, 20, there is a transparent fluid.

As disclosed in my Humphrey U.S. Pat. No. 3,711,178, the fluid, acting both on the sidewalls of the chamber and the surface of the flat plate, causes the mirror to undergo proportional angular motion with respect to the instrument when the chamber is subjected to vibrational angular motion through the vibrational angular motion of the binocular.

It will be apreciated that the stabilizer cell C here shown is placed approximately half way along the light path; it is equidistant from each of the objectives and equidistant from each of the eye pieces. In this location it is required that motion of plate 14 be intermediate between full inertial stabilization with respect to space and fully fixed case orientation.

It should be appreciated that the stabilizer can be placed in the binocular at locations both towards and away from the eye piece. Similarly, such movement will require a change in configuration of the stabilizer cell herein disclosed. The formula for determining both the required mirror movement together with the general parameters necessary for empirically adjusting the dimension of the stabilizer cell to accommodate the necessary mirror movement is disclosed in my Humphrey U.S. Pat. No. 3,711,178. It should also be noted that the distance between the stabilizing mirror, on one hand, and the objective or eye piece for each path on the other hand, is the same. This is preferred. It can be appreciated with reference to my Humphrey U.S. Pat. No. 3,711,178 and the formulae set forth therein that the distance between the stabilizer mirror, on one hand, and the objective or eye piece on the other hand, only need to be proportionally the same to produce overall identical stabilization.

Regarding corner cube mirror assembly B, it is conventional. Each of the reflecting surfaces 25, 26, 27, of the corner cube mirror assembly B is mutually orthogonal to the remaining surfaces.

Referring briefly to FIG. 3, the effect of the corner cube assembly can be easily understood. Specifically, the columnar light bundle of an object 01 projected on mirror 27 is reflected and displaced by the roof mirrors 25, 26 to impinge upon the stabilizer cell C as object 02. The image which impinges on the stabilizer cell C is inverted both vertically and left to right. After being retroreflected from stabilizer cell C and surface 15 of the cell C, the light converges and is retrodirected back through the mirror assembly to form in a columnar bundle at the image 03 shown on mirror 27. The light is again reflected, displaced and inverted. Thus, the light returns to its original parity.

It will be realized by those skilled in the optical art that corner cube mirrors have the function of displacing and retro-reflecting light. Moreover, the light rays entering and exiting a corner cube mirror assembly maintain their parallel relationship. Thus, light from the objective A1 and light to the stabilizer cell B is parallel. Likewise, light from the stabilizer cell C and to the eye piece E1 is in constant angular relation. It is only the reflective surface 15 of the plate 14 which causes angular deviation of the light.

Having set forth the function of the first light path, the second path from objective lens A2 to eye piece E2 can now be discussed.

Periscope mirror assembly F includes two mirrors 30, 31 arrayed in parallel planes. These mirrors are constructed as is conventional is periscope construction. Typically, the light between objective A2 and mirror 30 is reflected parallel to the light between mirror 31 and reflective surface 16 of plate 14. Similarly, and upon retro-reflection of the converging light rays, light is retro-reflected in parallel relation between the stabilizer cell C and mirror 31, and the eye piece E2.

In the embodiment here shown, a retro-reflective light path is used. It is therefore necessary to periscope outside of the entering optical bundle to eye pieces E1, E2. This is accomplished by a corner cube mirror assembly D which is illustrated in FIG. 2.

Referring to FIG. 2, three mirrors 35, 36, 37 are illustrated. Broadly, mirror 35 consists of a small diagonal mirror which periscopes the light path out of its retrodirected path to the objective A2. Mirrors 36, 37 configured in an orthogonal roof mirror array to the surface of mirror 35, reflect the light back to eye piece E2 where it is subsequently viewed. Moreover, it will be appreciated that both of the periscoping mirror arrays D are identical.

It will be appreciated to those skilled in the binocular art that interocular separation, as a practical matter, is absolutely required. The variable interocular separation of humans requires that the instrument be constructed to change the spacing between the eye pieces E1, E2.

Looking briefly at the schematic of FIG. 1, it will be seen that the instrument herein disclosed has multiple possibilities to provide such interocular separation. First, each of the objectives and eye pieces could be pivotally mounted together about an axis through stabilizer cell C. Second, one or both of the periscoping mirror assemblies D could be mounted for pivotal movement relative to the retro-directed light path towards the objectives A1, A2.

It will be noticed that the preferred embodiment of FIG. 1 has one apparent disadvantage. Specifically, the mirror 35 of the periscoping mirror assembly D affects an obstruction of the imcoming light bundle. Part of the total light that is ultimately transmitted to the eye pieces E1, E2 must necessarily be obscured. It will be appreciated that my alteration of the mirror arrays' angular alignment, the retro-reflected light could be deviated to one side or the other side of the objective incoming light path. This can, however, introduce small errors in optimum stabilization. For that reason, the alternate two stabilizing cell embodiments of FIGS. 4–8 can be used.

Two objectives A3, A4 typically comprising positive spherical lens combinations are shown. A first stabilizer cell C1 and a second stabilizer cell C2 form portions of a Porro prism like mirror array between each of the objectives A3, A4 and the eye pieces E3, E4.

To understand the invention herein illustrated, the function of a Porro prism in conventional binoculars will first be discussed. Thereafter, stabilizer cells C1, C2 will be described. Finally, the apparatus according to this invention for obtaining the desired interocular separation will be set forth.

Regarding the positive objective lenses and eye piece lenses A3, E3; A4, E4 respectively, it will be recognized that these optics are conventional Keplerian optics. In the absence of a system providing image inversion between the respective objective and eye pieces, images will appear inverted both vertically and left to right.

It has long been known in such optical systems that the placement of a Porro prism arrangement to affect image inversion is highly desirable. With such an arrangement, the highly advantageous exit pupil arrangement and wide angle viewing common to Keplerian optics can be preserved in a binocular.

It will be appreciated that once it is decided to use a Porro prism erecting system, stabilization of the resultant optical paths is a desirable function. I have discovered by realigning a mirror array to a rather unconventional Porro prism mirror array, that such stabilization can occur.

Referring again to FIG. 4, the Porro prism mirror array between objective A3 and eye piece E3 includes a first stabilized mirror 41, a first stationary mirror 43, a second stationary mirror 45, a second stabilizing mirror 47, and finally, an eye piece prism 49. Similarly, the light path between objective A4 includes a first stabilizing mirror 42, a first stationary mirror 44, a second stationary mirror 46, a moving stabilizing mirror 48, and an eye prism 50.

Movement of the mirrors 41, 42 to effect stabilization of rapid vibrational vertical panning of the binocular schematically illustrated can best be understood with reference to FIG. 5.

Referring to FIG. 5, first stabilizing mirror 41 and second stabilizing mirror 42 are shown connected by a rigid shaft 53 extending there between. Shaft 53 and its connected mirrors 41, 42 are in turn journaled to the end of the mirror containing housings at journals 54, 55. It will be appreciated that shaft 53 rigidly connectes mirrors 41, 42. These mirrors are connected in precise coplanar relation. The shaft makes the mirror move and function as one mirror, with light impinging upon a single mirror at differing locations. This is the precise type of stabilizer previously suggested in W. E. Humphrey U.S. Pat. No. 3,711,178, entitled "Mirror Stabilizer Having Space Referenced Motion", issued Jan. 16, 1973.

It will be appreciated that each of the housings for the mirror include an incoming transparent wall and an outgoing transparent wall. Mirror 40 includes incoming transparent wall 57 and outgoing transparent wall 59. Similarly, mirror 42 has an incoming transparent wall 58 and an outgoing transparent wall 60.

Each of the respective transparent wall 57, 59 and 58, 60 is affixed in fluid-tight relation over a rectangular housing 61, 62. The bottom of the rectangular housing 61, 62 is mounted in relative close proximity to the bottoms of mirrors 41, 42. A transparent fluid fills the chamber and influences mirror movement.

It will be noted that the stabilizing mirrors 41, 42 are relatively close to the objectives A3, A4. For the reasons disclosed in my above-referenced Humphrey U.S. Pat. No. 3,711,178, it is desired to alter and modify the movement of the stabilizing mirrors 41, 42 with respect to chambers 61, 62. It will be appreciated by applying the formulas for optically stabilized motion in the above-referenced patent, that empirical adjustment of the dimensions of the stabilizer chambers 61, 62 towards and away from the under surface of the mirrors 41, 42 is required. Adjustment of additional shape parameters such as mirror to chamber clearance may also be advantageous. This adjustment must continue until movement of the stabilizer occurs at the rate required to effect stabilization against vertical accidental angular motion of the binocular.

After passing through stabilizing mirror 41, the light path between objective A3 and eye piece E3 will impinge upon the first stationary miror 43, second stationary mirror 45, and then to second stabilizing mirror 47. Similarly, after impingement on first stabilizing mirror 42, the light path between objective A4 and eye piece E4 will impinge upon first stationary mirror 44, second stationary mirror 46, and then to second stabilizing mirror 48. It should be emphasized that it is the back to back relationship of mirrors 47, 48 in a single stabilizer cell C2 that has made possible the stabilized binocular of this invention. This stabilizing cell can best be viewed with reference to FIG. 6.

Referring to FIG. 6, reflective surfaces 47, 48 are shown on opposite sides of a plate 69. Plate 69 is mounted interiorly of a fluid-tight chamber. The chamber includes two hexagonal end walls 61, 62 which are preferably opaque. The hexagonal end walls are connected by opaque side walls 63, 64.

Incoming light to reflective surface 47 passes through a first transparent wall 65, and is reflected from surface 47 outside of the cell through a second transparent end wall 67.

Similarly, light to reflective surface 48 passes through a first transparent end wall 66 and out a second transparent end wall 68 filled with a transparent fluid. Additionally, a means is typically attached to the plate 69 to bias it to a preselected neutral position interior of the cell substantially in parallel alignment with the incoming line of sight.

Just as the stabilizer of FIG. 5 effects stabilization of the vertical accidental angular alignment (pitch) of the binocular, it will be appreciated that the stabilizing element of FIG. 6 effects stabilization of the accidental angular movement of the binocular in yaw.

It will be appreciated that the surfaces of the stabilizing cells C2 of FIG. 6 are relatively removed from plate 60 and its back to back reflective surface 47, 48. This configuration enables the reflective mirrors 47, 48 to move in a less restricted manner than the first stabilizer mirrors 41, 42. This is required because the stabilizer is a relatively great distance from the objective and closer to the imaging end of the paired ocular path. The exact desired rate of movement required can be determined with reference to may Humphrey U.S. Pat. No. 3,711,178.

In order to achieve the stabilization at cell C2, it will be noted that the Porro prism array has been altered. Specifically, in impingement on the last mirror in each Porro prism like mirror array, light has been angularly impinged upon and reflected from the stabilizer C2. Thus, the exit light rays to the prisms 49, 50 are at rapidly diverging angles. Eye piece prisms 49, 50 reflect the light internally and cause the reflected light to be passed outwardly parallel to the direction in which it was received.

Referring to FIG. 7, the construction of the eye piece prism, which is substantially identical to the eye piece prism 50, is disclosed.

Specifically, light from mirror 47 passes through the transparent face 70 of prism 49, impinges upon the rear reflective surface 71, and is reflected to surface 70 at an angle greater than critical. Because of this, it is reflected from surface 70 and passes outwardly of the prism through transparent face 72. As it passes outwardly from transparent face 72, it passes to eye piece E3 in a direction parallel to the direction in which light was received at objective A3.

It should be apparent that some provision should be made for varying the interocular spacing of eye pieces E3, E4. As can be seen in the cartoon series of FIGS. 7 and 8, eye piece prism 49 is specifically adapted to this function.

Eye piece prism 49 is typically mounted interior of a tube 80. Tube 80, in turn, telescopes interiorly of a tube 81. Both tube 80 and tube 81 are inclined with respect to the light path as it proceeds from reflective surface 47 to the eye piece prism 49.

Viewing FIG. 7 and then FIG. 8, it will be seen that when eye piece prism 49 is moved towards mirror 47 a shift of the image occurs. Specifically, the exit ray 82 from the eye piece prsim 49 shifts inwardly or towards the remaining eye piece E4. It should be further noted that in both the positions of FIG. 7 or FIG. 8, the distance along the optical path between objective A3 and eye piece E3 remains constant.

By the expedient of attaching a cam surface 85 and a cam rider 86, and mounting eye piece E3 to move with the cam surface laterally or towards and away from eye piece E4, variable interocular spacing is introduced. Specifically, eye piece E3 is made to ride concentrically above the exit eye path 82 from the eye prism 49.

It should be appreciated that this invention will admit of a number of modifications. For example, fluid stabilized chambers have been shown in this invention. It will be appreciated that gyroscopes and the like can be used to stabilize the mirrors here shown, although they are not preferred. Likewise, other modifications can be made without departing from the spirit and scope of this invention.

1. A stabilized binocular for equally deviating and stabilizing separate viewing paths for the paired separate eyes of a viewer comprising: first and second discrete viewing paths including an objective, an eye piece and a mirror array, each said mirror array including at least one stationary reflecting surface and at least one movable reflecting surface for each of said light paths for deviating and stabilizing light to each of said light paths; said movable reflecting surface in said mirror array for said first light path being substantially parallel to, coplanar with and back to back with said movable reflecting surface in said mirror array for said second light path; means for deflecting said movable reflecting surfaces about at least one axis substantially normal to the impingement of said light paths on said movable reflecting surfaces for reflective deviation and stabilization of each of said light paths through precisely identical movement of said reflecting surfaces.

2. The invention of claim 1 and including two movable reflective surfaces for each of said light paths; one of said reflective surfaces comprising a back to back reflective surface with one of said reflective surfaces of said other light path and the other of said reflective surfaces comprising a parallel and spaced apart coplanar reflecting surface with one of said reflective surfaces of said other light path.

3. The invention of claim 1 and including one movable reflective surface for each of said light paths; said one of said reflective surfaces comprising a back to back reflective surface with the other reflective surface for the other light path.

4. A stabilized binocular comprising: two discrete viewing paths including a first viewing path for said first eye, and a second viewing path for said second eye; said first viewing path including an objective, an eye piece and a mirror array; said second viewing path including an objective, an eye piece and a mirror array; a movable reflective surface for each light path, said movable reflective surface for said first light path substantially coplanar with, parallel to and back to back with said movable surface for said second light path; said first mirror array of said first light path including at least three stationary mirrors in a first corner cube mirror array for reflecting light from said objective to said movable reflective surface and reflecting light from said movable reflective surface to said eye piece of said first viewing path; said second mirror array of said second light path including at least two stationary mirrors in a periscope array for reflecting light from said objective to said movable reflective surface and reflecting light from said movable reflective surface to said eye piece of said second viewing path, and means for deflecting said movable reflecting surfaces about at least two axes substantially orthogonal to the impingement of each of said light paths on said movable reflective surfaces for deflective deviation and stabilization of each of said light paths through precisely identical movement of said reflective surfaces.

5. The invention of claim 4 and wherein said means for deflecting said mirror includes a fluid-tight chamber about said mirror attached to said binocular; a transparent fluid surrounding and at least partially supporting said mirror; and, first and second transparent portions in said fluid-tight chamber for entrance of said first and second discrete viewing paths.

6. The invention of claim 4 and wherein said movable reflecting surface is located equidistantly from said objective and said eye piece along said light path.

7. The invention of claim 4 and wherein said first and second discrete viewing paths are pivotal about said movable reflecting surface for changing the interocular separation at said eye piece between said first and second viewing paths.

8. The invention of claim 4 and including two second corner cube mirror assemblies for intercepting a part but not all of said light path between said movable mirror and said objective to relay light to said eye pieces.

9. The invention of claim 8 and wherein said at least one of said second corner cube mirror assemblies is pivotal to affect interocular separation between said light paths.

10. A stabilized binocular comprising: two discrete viewing paths including a first viewing path for said first eye, and a second viewing path for said second eye; said first viewing path including an objective, an eye piece and a mirror array including a first Porro prism mirror array; said second viewing path including an objective, an eye piece and a mirror array including a second Porro prism mirror array; each of said Porro prism mirror arrays including first and second movable reflecting surfaces for reflective deviation and stabilization of light passing there through; said first movable reflective surface of each Porro prism mirror array substantially coplanar and parallel to the first movable reflective surface of the other Porro prism mirror array; means for deflecting said first movable array of each Porro prism mirror array about a first single axis substantially normal to the impingement of each said light path on said movable reflective surface for reflective deviation and stabilization of each light path through precisely identical movement of said first reflective surfaces; said second movable reflective surfaces of each of said Porro prism mirror arrays substantially coplanar to, parallel to, and in back to back relation with the second movable reflective surface of the other Porro prism mirror array; means for deflecting said second movable mirror array of each Porro prism mirror array about a second single axis substantially orthogonal to both the impingement of light on said second movable reflective surface and said first single axis for reflective deviation and stabilization of each light path through precisely identical movement of said second reflective surfaces.

11. The invention of claim 10 and wherein each of said movable reflective surfaces is contained within a fluid-tight housing; each said fluid-tight housing having a transparent fluid therein with at least first and second transparent chamber side-walls for permitting the entrances of light to and the exit of light from said reflective surfaces.

12. The invention of claim 10 and wherein each of said reflective surfaces is located at positions other than the midway position between said objective and said eye pieces in each of said first and second viewing paths.

13. An optical stabilizing cell for use in combination with a binocular for stabilizing vibrational angular orientations comprising: a fluid-tight chamber, a flat reflective plate within said chamber having reflective surfaces on both sides of said plate; said chamber having first and second transparent portions in first and second walls of said chamber; means for biasing said flat reflective plate to a preselected neutral position in said chamber for reflecting incident light to said reflective surfaces through said transparent portions of said wall; a transparent fluid interior of said chamber and surrounding said mirror to at least partially buoyantly support said mirror; and coupling means including a surface movable with said chamber and a surface movable wtih said flat plate for coupling said flat plate to said chamber through said fluid to act on said biasing means through said flat reflective plate.

* * * * *